US012630770B2

(12) United States Patent
Suzuki et al.

(10) Patent No.: US 12,630,770 B2
(45) Date of Patent: May 19, 2026

(54) HYDROTREATING CATALYST FOR HYDROCARBON OIL, METHOD FOR PRODUCING HYDROTREATING CATALYST FOR HYDROCARBON OIL, AND HYDROTREATING METHOD FOR HYDROCARBON OIL

(71) Applicant: Cosmo Oil Co., Ltd., Tokyo (JP)

(72) Inventors: Shinya Suzuki, Tokyo (JP); Takamaro Kawai, Tokyo (JP); Hikaru Yamada, Tokyo (JP)

(73) Assignee: COSMO OIL CO., LTD., Tokyo (JP)

( * ) Notice: Subject to any disclaimer, the term of this patent is extended or adjusted under 35 U.S.C. 154(b) by 570 days.

(21) Appl. No.: 18/013,867

(22) PCT Filed: Jun. 30, 2021

(86) PCT No.: PCT/JP2021/024744
§ 371 (c)(1),
(2) Date: Dec. 29, 2022

(87) PCT Pub. No.: WO2022/004786
PCT Pub. Date: Jan. 6, 2022

(65) Prior Publication Data
US 2023/0295522 A1 Sep. 21, 2023

Related U.S. Application Data

(60) Provisional application No. 63/047,921, filed on Jul. 3, 2020.

(30) Foreign Application Priority Data

Jul. 31, 2020 (JP) ................................. 2020-130680

(51) Int. Cl.
| | | |
|---|---|---|
| C10G 45/08 | (2006.01) | |
| B01J 21/04 | (2006.01) | |
| B01J 21/06 | (2006.01) | |
| B01J 23/06 | (2006.01) | |
| B01J 35/00 | (2024.01) | |
| B01J 35/30 | (2024.01) | |
| B01J 35/45 | (2024.01) | |
| B01J 37/02 | (2006.01) | |
| B01J 37/08 | (2006.01) | |

(52) U.S. Cl.
CPC .............. *C10G 45/08* (2013.01); *B01J 21/04* (2013.01); *B01J 21/063* (2013.01); *B01J 23/06* (2013.01); *B01J 35/393* (2024.01); *B01J 35/45* (2024.01); *B01J 37/0203* (2013.01); *B01J 37/0213* (2013.01); *B01J 37/08* (2013.01); *B01J 2235/00* (2024.01); *B01J 2235/30* (2024.01); *C10G 2300/1044* (2013.01); *C10G 2300/703* (2013.01)

(58) Field of Classification Search
CPC ......... C10G 45/08; B01J 35/45; B01J 35/393;

B01J 2235/30; B01J 2235/00; B01J 21/04; B01J 21/063; B01J 23/06; B01J 37/0203; B01J 37/0213; B01J 37/08
See application file for complete search history.

(56) References Cited

U.S. PATENT DOCUMENTS

| | | | |
|---|---|---|---|
| 4,652,546 A | 3/1987 | Aldag, Jr. et al. | |
| 4,707,246 A | 11/1987 | Gardner et al. | |
| 4,762,814 A * | 8/1988 | Parrott ................. | B01J 23/8873 |
| | | | 502/220 |
| 2016/0220986 A1 | 8/2016 | Osaki et al. | |
| 2016/0230102 A1 | 8/2016 | Osaki et al. | |

FOREIGN PATENT DOCUMENTS

| | | |
|---|---|---|
| CN | 101305079 A | 11/2008 |
| CN | 101480618 A | 7/2009 |
| CN | 101632934 A | 1/2010 |
| CN | 102302935 A | 1/2012 |
| CN | 103657657 A | 3/2014 |
| CN | 105579132 A | 5/2016 |
| CN | 107583659 A | 1/2018 |
| CN | 110935431 A | 3/2020 |
| JP | 858-11040 A | 1/1983 |
| JP | H06-184558 A | 7/1994 |
| JP | H08071426 A | 3/1996 |
| JP | H09-165591 A | 6/1997 |
| JP | H09248461 A | 9/1997 |
| JP | 2013027847 A | 2/2013 |
| WO | 2015/046345 A1 | 4/2015 |

OTHER PUBLICATIONS

Extended European Search Report issued Jun. 21, 2024 in EP Application No. 21831698.2.
International Search Report mailed on Aug. 24, 2021 in PCT/JP2021/024744.
Office Action issued Mar. 18, 2025 in JP Application No. 2021109385.
Kai, X., "Effect of Silver Promoter on the Performance of Ni/TiO2-Al2O3 Catalyst in Selective Hydrogenation of Cyclopentadiene," Speciality Petrochemicals, vol. 35, No. 4, pp. 30-34 (2018) (English abstract on last page).
Nakajima et al., "Activity and Stability of Zinc and Phosphorus Modified NiMo/Al2O3 Catalyst for Residue Hydrodesulfurization," Journal of The Japan Petroleum Institute, vol. 56, No. 6, pp. 388-394 (2013).
Notice of Allowance and Search Report issued May 2, 2024 in CN Application No. 202180042171.9 (English translation of Search Report only).
Office Action issued Nov. 24, 2023 in CN Application No. 202180042171.9, with English translation of search report.
Notice of Allowance issued Jan. 13, 2026 in JP Application No. 2021109385.

* cited by examiner

*Primary Examiner* — Yong L Chu
(74) *Attorney, Agent, or Firm* — Panitch Schwarze Belisario & Nadel LLP

(57) ABSTRACT
A hydrotreating catalyst for a hydrocarbon oil is provided in which at least one metal selected from Group 6 metals in the periodic table and at least one metal selected from Group 9 and Group 10 metals in the periodic table are supported on a zinc/titanium-containing alumina carrier containing zinc and titanium.

9 Claims, No Drawings

HYDROTREATING CATALYST FOR HYDROCARBON OIL, METHOD FOR PRODUCING HYDROTREATING CATALYST FOR HYDROCARBON OIL, AND HYDROTREATING METHOD FOR HYDROCARBON OIL

CROSS-REFERENCE TO RELATED APPLICATIONS

This application is a Section 371 of International Application No. PCT/JP2021/024744, filed Jun. 30, 2021, which was published in the Japanese language on Jan. 6, 2022 under International Publication No. WO 2022/004786 A1, which claims priority under 35 U.S.C. § 119(b) to Japanese Application No. 2020-130680, filed Jul. 31, 2020, which claims the benefit of U.S. Provisional Application No. 63/047,921, filed Jul. 3, 2020, the disclosures of which are incorporated herein by reference in their entireties.

TECHNICAL FIELD

The present invention relates to a catalyst for hydrotreating a hydrocarbon oil (hydrotreating catalyst) for a hydrocarbon oil), a method for producing a hydrotreating catalyst for a hydrocarbon oil, and a method for hydrotreating a hydrocarbon oil.

BACKGROUND ART

Due to the decrease in demand for heavy oil, there is a need for a technique for efficiently converting the atmospheric distillation residual oil obtained by treating crude oil with an atmospheric distillation apparatus and the vacuum distillation residual oil obtained by treating the atmospheric distillation residual oil with a vacuum distillation apparatus, which are the main heavy oil base materials, into light oil with high added values.

As a technique for converting a heavy oil base material into light oil, a process of producing a middle distillate of gasoline, kerosene, gas oil and the like by treating an atmospheric distillation residual oil or a mixed oil of atmospheric distillation residual oil and vacuum distillation residual oil with a fluidized catalytic cracker has been known.

The raw oil treated by the fluidized catalytic cracker needs to reduce the sulfur content to a certain level or less in order to satisfy the standard of a target middle distillate and from the viewpoint of protecting a fluid catalytic cracking catalyst. Therefore, the above atmospheric distillation residual oil or the above mixed oil is subjected to a hydrotreatment by a hydrotreating catalyst and then treated with a fluidized catalytic cracker.

Hydrotreating of difficult-to-desulfurize atmospheric distillation residual oil and vacuum distillation residual oil requires strict treatment conditions such as high temperature and high pressure, and there is a problem that the hydrotreating catalyst is likely to deteriorate and the catalyst life is shortened.

As one of the factors for degrading hydrotreating catalysts, coke degradation due to a carbon fraction (coke) generated by a decomposition reaction has been known. Coke is deposited on the hydrotreating catalyst and covers active sites of the hydrotreating catalyst and/or blocks pores of the hydrotreating catalyst, thereby reducing the catalytic activity. In particular, since a number of active sites (acid sites) having high decomposition reaction activity are present on the surface of the hydrotreating catalyst at the start of the reaction, a large amount of coke is generated, and a remarkable decrease in catalytic activity is confirmed.

When the catalytic activity of the hydrotreating catalyst decreases, it is necessary to raise the reaction temperature in order to maintain a constant hydrotreating performance.

However, a hydrotreater has a maximum operating temperature set according to its material, structure, and capacity of peripheral equipment, and there is a restriction that the operation must be carried out at the above maximum operating temperature or lower. Therefore, it is necessary to replace the hydrotreating catalyst with a new one when reaching the above maximum operating temperature, and the frequency of replacement of the hydrotreating catalyst substantially becomes the lifetime of the hydrotreating catalyst.

From such a background, in the hydrotreatment of difficult-to-desulfurize atmospheric distillation residual oil and vacuum distillation residual oil, a hydrotreating catalyst whose activity is unlikely to decrease and having a long life is desired.

Patent Document 1 discloses that the coke degradation of the hydrotreating catalyst can be suppressed by containing zinc oxide in the hydrotreating catalyst.

CITATION LIST

Patent Document

[Patent Document 1] International Patent Publication No. 2015/046345

SUMMARY OF INVENTION

Technical Problem

In recent years, in order to convert more heavy oil base materials into light oils, it has been required to increase the amount of atmospheric distillation, residual oil and vacuum distillation residual oil treated. In order to increase the amount of atmospheric distillation residual oil and vacuum distillation residual oil treated, stricter treatment conditions are required, and the degradation of the hydrotreating catalyst also becomes even more severe. Therefore, there is a demand for a hydrotreating catalyst whose activity is even less likely to decrease, but the catalyst life of the hydrotreating catalyst described in Patent Document 1 is not sufficient.

The present invention has been made in view of the above circumstances, with an object of providing a hydrotreating catalyst for a hydrocarbon oil whose activity for hydrogenating a hydrocarbon oil is unlikely to decrease and having a longer life than a conventional catalyst; a method for producing the aforementioned hydrotreating catalyst for a hydrocarbon oil, and a method for hydrotreating a hydrocarbon oil using the aforementioned hydrotreating catalyst for a hydrocarbon oil.

Solution to Problem

In order to solve the above problems the present invention includes the following aspects.

[1-1] A hydrotreating catalyst, for a hydrocarbon oil, the hydrotreating catalyst in which at least one metal selected from Group 6 metals in the periodic table and at least one metal selected from Group 9 and Group 10 metals in the periodic table are supported on a zinc/titanium-containing alumina carrier containing zinc and titanium, wherein a content ratio of the aforementioned zinc is 0.8 to 10% by mass in terms of an element based on the catalyst, a content ratio of the aforementioned titanium is 0.03 to 10% by mass in terms of an element based on the catalyst, a content ratio of the aforementioned at least one metal selected from Group 6 metals in the periodic table is 5 to 16% by mass in terms of an element based on the catalyst, and a content ratio of the aforementioned at least one metal selected from Group 9 and Group 10 metals in the periodic table is 1 to 5% by mass in terms of an element based on the catalyst.

[1] A hydrotreating catalyst for a hydrocarbon oil, the hydrotreating catalyst in which at least one metal selected from Group 6 metals in the periodic table and at least one metal selected from Group 9 and Group 10 metals in the periodic table are supported on a zinc/titanium-containing alumina carrier containing zinc and titanium, wherein a content ratio of the aforementioned zinc is 0.8 to 10% by mass in terms of an element based on the catalyst, a content ratio of the aforementioned titanium is 0.03 to 10% by mass in terms of an element based on the catalyst, a content ratio of the aforementioned at least one metal selected from Group 6 metals in the periodic table is 5 to 16% by mass in terms of an element based on the catalyst, and a content ratio of the aforementioned at least one metal selected from Group 9 and Group 10 metals in the periodic table is 1 to 5% by mass in terms of an element based on the catalyst, and an average particle size of titanium element-derived particles observed when the aforementioned hydrotreating catalyst is analyzed by a transmission electron microscope using energy dispersive X-ray analysis is 0.3 to 10 nm.

[2] The hydrotreating catalyst for a hydrocarbon oil according to [1-1] or [1], wherein the aforementioned carrier is a zinc/titanium/phosphorus-containing alumina carrier further containing phosphorus, and a content ratio of the aforementioned phosphorus is 0.04 to 2% by mass in terms of an element based on the catalyst.

[3] The hydrotreating catalyst for a hydrocarbon oil according to [1-1], [1], or [2], wherein an average particle size of zinc element-derived particles, observed when the aforementioned hydrotreating catalyst is analyzed by a transmission electron microscope using energy dispersive X-ray analysis is 0.3 to 10 nm.

[4-1] A method for producing a hydrotreating catalyst for a hydrocarbon oil, the method including causing a zinc/titanium-containing alumina carrier containing 1 to 14% by mass of zinc in terms of an element based on the carrier and 0.1 to 13% by mass of titanium in terms of an element, based on the carrier to support, so as to contain, 5 to 16% by mass of at least one metal selected from Group 6 metals in the periodic table in terms of an element based on the catalyst, and 1 to 5% by mass of at least one metal selected from Group 9 and Group 10 metals in the periodic table in terms of an element based on the catalyst.

[4] A method for producing a hydrotreating catalyst for a hydrocarbon oil, the method including causing a zinc/titanium-containing alumina carrier containing 1 to 14% by mass of zinc in terms of an element based on the carrier and 0.1 to 13% by mass of titanium in terms of an element based on the carrier to support, so as to contain, 5 to 16% by mass of at least one metal selected from Group 6 metals in the periodic table in terms of an element based on the catalyst, and 1 to 5% by mass of at least one metal selected from Group 9 and Group 10 metals in the periodic table in terms of an element based on the catalyst, wherein an average particle size of titanium, element-derived particles observed when the aforementioned hydrotreating catalyst is analyzed by a transmission electron microscope using energy dispersive X-ray analysis is 0.3 to 10 nm.

[5] The method for producing a hydrotreating catalyst for a hydrocarbon oil according to [4-1] or [4], wherein the aforementioned carrier is a zinc/titanium/phosphorus-containing alumina carrier further containing 0.04 to 3% by mass of phosphorus in terms of an element based on the carrier.

[6] The method for producing a hydrotreating catalyst according to [4-1], [4], or [5], wherein an average particle size of zinc element-derived particles observed when the aforementioned hydrotreating catalyst is analyzed by a transmission electron microscope using energy dispersive X-ray analysis is 0.3 to 10 nm.

[7] A method for producing a hydrogenated hydrocarbon oil, wherein the hydrotreating catalyst fora hydrocarbon oil according to any one of [1-1] and [1] to [3] and a hydrocarbon oil are subjected to a contact treatment to carry out a hydrotreatment at a hydrogen partial pressure of 3 to 20 MPa, a reaction temperature of 280 to 450° C., and a liquid hourly space velocity of 0.01 to 5 $hr^{-1}$.

[8] A method for hydrotreating a hydrocarbon oil, wherein the hydrotreating catalyst fora hydrocarbon oil according to any one of [1-1] and [1] to [3] and a hydrocarbon oil are subjected to a contact treatment at a hydrogen partial pressure of 3 to 20 MPa, a reaction temperature of 280 to 450° C., and a liquid hourly space velocity of 0.01 to 5 $hr^{-1}$.

Advantageous Effects of Invention

According to the present invention, it is possible to provide a hydrotreating catalyst for a hydrocarbon oil whose activity for hydrogenating a hydrocarbon oil is unlikely to decrease and having a longer life than a conventional catalyst. Further, it is possible to provide a method for producing the aforementioned hydrotreating catalyst for a hydrocarbon oil and a method for hydrotreating a hydrocarbon oil using the aforementioned hydrotreating catalyst for a hydrocarbon oil.

DESCRIPTION OF EMBODIMENTS

Hereinafter, embodiments of the present invention will be described in detail, but the following description is an example of the embodiments of the present invention, and the present invention is not limited to these contents and can be modified and implemented within the scope of the gist thereof.

Catalyst for Hydrotreating Hydrocarbon Oil

A hydrotreating catalyst for a hydrocarbon oil according to the present embodiment (hereinafter, also simply referred to as a "hydrotreating catalyst") contains alumina, zinc, titanium, at least one metal selected from Group 6 metals in the periodic table, and at least one metal selected from Group 9 and Group 10 metals in the periodic table.

The hydrotreating catalyst is a hydrotreating catalyst for a hydrocarbon oil in which at least one metal selected from Group 6 metals in the periodic table and at least one metal selected from Group 9 and Group 10 metals in the periodic table are supported on a zinc/titanium-containing alumina carrier containing zinc and titanium. A content ratio of the aforementioned zinc is 0.8 to 10% by mass in terms of an element based on the catalyst, a content ratio of the aforementioned titanium is 0.03 to 10% by mass in terms of an element based on the catalyst, a content ratio of the aforementioned at least one metal selected from Group 6 metals in the periodic table is 5 to 16% by mass in terms of an element based on the catalyst, and a content ratio of the aforementioned at least one metal selected from Group 9 and Group 10 metals in the periodic table is 1 to 5% by mass in terms of an element based on the catalyst. An average particle size of titanium element-derived particles observed when the aforementioned hydrotreating catalyst is analyzed by a transmission electron microscope using energy dispersive X-ray analysis is preferably 0.3 to 10 nm.

In the present specification, the expression "Group 6 metals in the periodic table" (hereinafter, may be referred to as "Group 6 metals") means Group 6 metals in the long form periodic table, and the expression "Group 9 and Group 10 metals in the periodic table" (hereinafter, may be referred to as "Group 9 and Group 10 metals") means Group 9 and Group 10 metals in the long form periodic table.

The Group 6 metals and Group 9 and Group 10 metals are also collectively referred to as "hydrogenation active components".

In the present specification, the expression "content ratio in terms of an element based on the catalyst" refers to a ratio of the mass of a specific element with respect to the total mass of the hydrotreating catalyst.

As the alumina in the hydrotreating catalyst, various alumina forms such as α-alumina, β-alumina, γ-alumina, and δ-alumina can be used. An alumina form which is porous and has a high specific surface area is preferred, and γ-alumina is more preferred.

The purity of alumina is preferably 98% by mass or more, and more preferably 99% by mass or more. Examples of impurities in alumina include $SO_4^{2-}$, $Cl^-$, $Fe_2O_3$ and $Na_2O$. The lesser these impurities, the better. The content of the total amount of impurities with respect to the total mass of alumina is preferably 2% by mass or less, and more preferably 1% by mass or less. For each component, it is preferable that $SO_4^{2-}$ is 1.5% by mass or less and $Cl^-$, $Fe_2O_3$ and $Na_2O$ are 0.1% by mass or less, respectively, with respect to the total mass of alumina.

The alumina in the hydrotreating catalyst may be a composite alumina material obtained by combining at least one oxide selected from zeolite, silica, and zirconia. The composite alumina material refers to a mixture of alumina and the above oxide, or a complex oxide of alumina and the above oxide. The content ratio of alumina with respect to the total mass of the composite alumina material is preferably 92 to 99.9% by mass, and more preferably 95 to 98% by mass. The total content ratio of at least one oxide selected from zeolite, silica, and zirconia with respect to the total mass of the composite alumina material is preferably 0.1 to 8% by mass, and more preferably 2 to 5% by mass. As the above-mentioned zeolite, silica, and zirconia serving as a composite component, those generally used as a carrier component of this type of catalyst can be used.

The content ratio of alumina (including the composite alumina material) in the hydrotreating catalyst is preferably 55 to 90% by mass, more preferably 65 to 80% by mass, and still more preferably 65 to 75% by mass based on the catalyst. The content ratio of alumina in the hydrotreating catalyst can be obtained by calculating the difference in mass of each component (zinc, titanium, phosphorus, boron, Group 6 metal, and Group 9 and Group 10 metals) in terms of the oxide in the hydrotreating catalyst from the total mass of the hydrotreating catalyst. The mass of each component in terms of the oxide can be obtained by measuring the mass of each component in terms of an element in the hydrotreating catalyst by the measurement method described later, and converting zinc to ZnO, titanium to $TiO_2$, phosphorus to $P_2O_5$, boron to $B_2O_3$, Group 6 metals to hexavalent oxides ($MoO_3$ when the Group 6 metal is Mo), and Group 9 and Group 10 metals to divalent oxides (NiO when the Group 10 metal is Ni).

Examples of the form of zinc in the hydrotreating catalyst include zinc simple substance and zinc compounds. Only one of zinc simple substance and zinc compound may be contained in the hydrotreating catalyst, or both of them may be contained.

Examples of the zinc compound in the hydrotreating catalyst include zinc oxide, zinc nitrate, zinc sulfate, zinc carbonate, zinc phosphate, zinc aluminate, zinc titanate and zinc molybdate, and zinc oxide and zinc aluminate are preferred. Examples of the zinc compound in the hydrotreating catalyst include, in addition to the above compounds, a complex oxide and complex sulfide of zinc with at least one selected from the group consisting of titanium, phosphorus, boron, Group 6 metal, and Group 9 metal and Group 10 metal contained in the hydrotreating catalyst.

The zinc compound in the hydrotreating catalyst may include only one type of compound or two or more types of compounds.

The content ratio of zinc in the hydrotreating catalyst is 0.8 to 10% by mass, preferably 2 to 5% by mass, and more preferably 2.5 to 4% by mass in terms of an element based on the catalyst. When the content ratio of zinc is equal to or more than the lower limit value of the above range, the effect of neutralizing the acid site on the surface of the hydrotreating catalyst to serve as the active site for coke formation improves, and the coke formation is suppressed. Further, hydrogen molecules dissociate on the surface of zinc to generate active hydrogen species, thereby improving the hydrogenation activity of the hydrogenation active component with respect to coke and coke precursors. When the content ratio of zinc is equal to or less than the upper limit value of the above range, the pore volume and specific surface area of the hydrotreating catalyst are unlikely to decrease, the Group 6 metal is sufficiently dispersed, and the degree of sulfurization of the Group 9 and Group 10 metals are unlikely to decrease.

In the present specification, the content ratio of zinc and the like described above in terms of elements in the hydrotreating catalyst and in the carrier can be measured by inductively coupled plasma optical emission spectrometry.

The average particle size of the zinc element-derived particles observed when the hydrotreating catalyst is analyzed by a transmission electron microscope using energy dispersive X-ray analysis (hereinafter, also referred to as "TEM-EDS") is preferably 0.3 to 10 nm, more preferably 0.3 to 5 nm, and still more preferably 0.3 to 2 nm. When the average particle size of the zinc, element-derived particles is within the above range, it is possible to neutralize a sufficient number of acid sites and to generate a sufficient amount of active hydrogen species without causing a large decrease in the pore volume and specific surface area of the hydrotreating catalyst.

In the present specification, the expression "zinc element-derived particles" refer to particles containing zinc element as a main component, which is confirmed by a transmission electron microscope equipped with an energy dispersive X-ray spectrometer (hereinafter, also referred to as "TEM-EDS"). Hereinafter, the expressions "titanium element-derived particles" and "phosphorus element-derived particles" also refer to particles containing titanium element, and phosphorus element confirmed by TEM-EDS as main components, respectively. As the measurement conditions for TEM-EDS, the measurement conditions described in Examples described later can be adopted.

The particles containing zinc element as a main component can be identified by the energy level of 8.630 (keV) of the characteristic X-ray emitted from the sample.

The particles containing titanium element as a main component can be identified by the energy level of 4.508 (keV) of the characteristic X-ray emitted from the sample.

The particles containing phosphorus element as a main component can be identified by the energy level of 2.013 (keV) of the characteristic X-ray emitted from the sample.

In a planar image of the zinc element-derived particles observed by TEM-EDS, the particle size of the zinc element-derived particles in the hydrotreating catalyst means the maximum distance between two parallel straight lines sandwiching the aforementioned image. The average particle size of the zinc element-derived particles in the hydrotreating catalyst means an average particle size of 10 randomly selected zinc element-derived particles.

The shape of the zinc element-derived particles in the hydrotreating catalyst is not particularly limited, but is preferably a substantially circular shape.

In the present specification, the shape of a particle being substantially circular means a ratio of the minimum distance ($L_{min}$) with respect to the maximum distance ($L_{max}$) of two parallel straight lines sandwiching the aforementioned image in the planar image of the particle observed by the TEM-EDS described above is 0.8 to 1.

Examples of the form of titanium in the hydrotreating catalyst include titanium simple substance and titanium compounds. Only one of titanium simple substance and titanium compound may be contained in the hydrotreating catalyst, or both of them may be contained.

Examples of the titanium compound in the hydrotreating catalyst include titanium oxide, aluminum titanate, zinc titanate and nickel titanate, and titanium oxide, zinc titanate and nickel titanate are preferred. Examples of the titanium compound in the hydrotreating catalyst include, in addition to the above compounds, a complex oxide and complex sulfide of titanium with at least one selected from the group consisting of zinc, phosphorus, boron, Group 6 metal, and Group 9 metal and Group 10 metal contained in the hydrotreating catalyst.

The titanium compound in the hydrotreating catalyst may include only one type of compound or two or more types of compounds.

The content ratio of titanium in the hydrotreating catalyst is 0.03 to 10% by mass, preferably 2 to 8% by mass, and more preferably 4 to 7.5% by mass in terms of an element based on the catalyst. When the content ratio of titanium is equal to or more than the lower limit value of the above range, the interaction between the hydrogenation active component and alumina is weakened, and the activity of the hydrogenation active component is increased. Further, the efficiency of the active hydrogen species generated by zinc for moving to the hydrogenation active component, on the surface of the catalyst is enhanced. When the content ratio of titanium is equal to or less than the upper limit value of the above range, the dispersibility of titanium improves, the particle size of the titanium element-derived particles observed when the hydrotreating catalyst is analyzed by ELM-EDS becomes a certain size or smaller, and the above effects can be easily obtained.

The average particle size of the titanium element-derived particles observed when the hydrotreating catalyst is analyzed by TEM-EDS is preferably 0.3 to 10 nm, more preferably 0.3 to 5 nm, and still more preferably 0.3 to 2 nm. When the average particle size of the titanium element-derived particles is within the above range, the above effects can be easily obtained without causing a large decrease in the pore volume and specific surface area of the hydrotreating catalyst.

In a planar image of the titanium element-derived particles observed by TEM-EDS, the particle size of the titanium element-derived particles in the hydrotreating catalyst means the maximum distance between two parallel straight lines sandwiching the aforementioned image. The average particle size of the titanium element-derived particles in the hydrotreating catalyst means an average particle size of 10 randomly selected titanium element-derived particles. The shape of the titanium element-derived particles in the hydrotreating catalyst is not particularly limited, but is preferably a substantially circular shape.

A molar ratio of titanium with respect to zinc in the hydrotreating catalyst (titanium element/zinc element) is preferably 0.1 to 12, more preferably 0.4 to 8, and still more preferably 2 to 4. When the molar ratio is within the above range, the active hydrogen species generated by zinc can be efficiently moved to the surface of the catalyst.

A ratio of the average particle size of titanium element-derived particles with respect to the average particle size of zinc element-derived particles in the hydrotreating catalyst ((average particle size of titanium element-derived particles)/(average particle size of zinc element-derived particles)) is preferably 0.1 to 5, more preferably 0.4 to 3, and still more preferably 0.7 to 1. When the aforementioned ratio of the average particle size is within the above range, a decrease in the activity of the zinc element-derived particles and the titanium element-derived particles due to sintering is less likely to occur, and a decrease in the transfer efficiency of the active hydrogen species can be suppressed.

Examples of the Group 6 metal include molybdenum, tungsten and chromium, and among them, molybdenum having a high hydrogenation activity per unit mass is preferred.

Examples of the form of the Group 6 metal in the hydrotreating catalyst include a Group 6 metal simple substance and a Group 6 metal compound. Only one of Group 6 metal simple substance and Group 6 metal compound may be contained in the hydrotreating catalyst, or both of them may be contained.

As the Group 6 metal compound in the hydrotreating catalyst, a molybdenum compound is preferred, and examples thereof include molybdenum trioxide, molybdophosphoric acid, ammonium molybdate, molybdenum sulfide, aluminum molybdate, nickel molybdate, zinc molybdate and molybdic acid, and molybdophosphoric acid, molybdenum trioxide, nickel molybdate and zinc molybdate are preferred. Examples of the Group 6 metal compound in the hydrotreating catalyst include, in addition to the above compounds, a complex oxide and complex sulfide of Group 6 metal with at least one selected from the group consisting of zinc, titanium, phosphorus, boron, and Group 9 metal and Group 10 metal contained in the hydrotreating catalyst.

The Group 6 metal compound in the hydrotreating catalyst may include only one type of compound or two or more types of compounds.

The content ratio of the Group 6 metal in the hydrotreating catalyst is 5 to 16% by mass, preferably 6 to 13% by mass, more preferably 6 to 10% by mass, and still more preferably 7 to 10% by mass in terms of an element based on the catalyst. When the content ratio of the Group 6 metal is equal to or more than the lower limit value of the above range, it is sufficient for exhibiting the effects caused by the Group 6 metal. When the content ratio of the Group 6 metal is equal to or less than the upper limit value of the above range, the Group 6 metal hardly aggregates and is sufficiently dispersed. That is, the amount of the Group 6 metal that can be efficiently dispersed is not exceeded, and the surface area of the catalyst is not reduced considerably, so that the catalytic activity can be improved.

Examples of the Group 9 and Group 10 metals include nickel and cobalt, and among them, nickel having a high hydrogenation ability and a low catalyst preparation cost is preferred. It should be noted that the hydrotreating catalyst may contain only a Group 9 metal, may contain only a Group 10 metal, or may contain a Group 9 metal and a Group 10 metal.

Examples of the form of the Group 9 and Group 10 metals in the hydrotreating catalyst include Group 9 and Group 10 metal simple substances and Group 9 and Group 10 metal compounds. Only one of Group 9 and Group 10 metal simple substances and Group 9 and Group 10 metal compounds may be contained in the hydrotreating catalyst, or both of them may be contained.

Examples of the Group 9 and Group 10 metal compounds in the hydrotreating catalyst include oxides, carbonates, nitrates, sulfates, phosphates, aluminates, titanates and molybdates of nickel, and phosphates, titanates and molybdates are preferred. Examples of the Group 9 and Group 10 metal compounds in the hydrotreating catalyst include, in addition to the above compounds, a complex oxide and complex sulfide of Group 9 and Group 10 metals with at least one selected from the group consisting of zinc, titanium, phosphorus, boron, and Group 6 metal contained in the hydrotreating catalyst.

The Group 9 and Group 10 metal compounds in the hydrotreating catalyst may include only one type of compound or two or more types of compounds.

The content ratio of the Group 9 and Group 10 metals in the hydrotreating catalyst is 1 to 5% by mass, preferably 2 to 4% by mass, and more preferably 2.5 to 3.5% by mass in terms of elements based on the catalyst. When the content ratio of the Group 9 and Group 10 metals is equal to or more than the lower limit value of the above range, the active sites attributed to the Group 9 and Group 10 metals can be sufficiently obtained. When the content ratio of the Group 9 and Group 10 metals is equal to or less than the upper limit value of the above range, the Group 9 and Group 10 metals hardly aggregate and the dispersibility improves. For example, when nickel is used as the Group 9 and Group 10 metals, since NiO species (present as NiS species after catalyst sulfurization or during hydrogenation treatment) which is an inactive precursor or Ni spinel species incorporated into the lattice of the carrier s unlikely to be generated, the catalytic activity improves.

The hydrotreating catalyst of the present embodiment preferably further contains either one or both of phosphorus and boron. More specifically, the carrier of the hydrotreating catalyst is preferably a zinc/titanium/(phosphorus and/or boron)-containing alumina carrier containing zinc, titanium, and either one or both of phosphorus and boron.

Examples of the form of phosphorus in the hydrotreating catalyst include phosphorus simple substance and phosphorus compounds. Only one of phosphorus simple substance and phosphorus compound may be contained in the hydrotreating catalyst, or both of them may be contained.

Examples of the phosphorus compound in the hydrotreating catalyst include phosphorus oxide, molybdophosphoric acid, ammonium phosphate, aluminum phosphate, zinc phosphate, titanium phosphate and nickel phosphate, and phosphorus oxide, molybdophosphoric acid and nickel phosphate are preferred. Examples of the phosphorus compound in the hydrotreating catalyst include, in addition to the above compounds, a complex oxide and complex sulfide of phosphorus with at least one selected from the group consisting of zinc, titanium, boron Group 6 metal, and Group 9 metal and Group 10 metal contained in the hydrotreating catalyst.

The phosphorus compound in the hydrotreating catalyst may include only one type of compound or two or more types of compounds.

The content ratio of phosphorus in the hydrotreating catalyst is preferably 0.04 to 2% by mass, more preferably 0.2 to 1% by mass, and still more preferably 0.3 to 0.8% by mass in terms of an element based on the catalyst. When the content ratio of phosphorus is equal to or more than the lower limit value of the above range, the degree of sulfurization of the Group 6 metal can be sufficiently improved. Further, a decrease in the activity of the hydrogenation active component is suppressed. When the content ratio of phosphorus is equal to or less than the upper limit value of the above range, the pore volume and the specific surface area are unlikely to decrease, the Group 6 metal is sufficiently dispersed, and the degree of sulfurization of the Group 9 and Group 10 metals are unlikely to decrease.

The average particle size of the phosphorus element-derived particles observed when the hydrotreating catalyst is analyzed by TEM-EDS is preferably 0.3 to 10 nm, more preferably 0.3 to 5 nm, and still more preferably 0.3 to 2 nm.

In a planar image of the phosphorus element-derived particles observed by TEM-EDS, the particle size of the phosphorus element-derived particles in the hydrotreating catalyst means the maximum distance between two parallel straight lines sandwiching the aforementioned image. The average particle size of the phosphorus element-derived particles in the hydrotreating catalyst means an average particle size of 10 randomly selected phosphorus element-derived particles. The shape of the phosphorus element-derived particles in the hydrotreating catalyst is not particularly limited, but is preferably a substantially circular shape.

When the hydrotreating catalyst contains phosphorus, a molar ratio of titanium with respect to phosphorus in the hydrotreating catalyst (titanium element/phosphorus element) is preferably 0.5 to 15, more preferably 1 to 13, and still more preferably 5 to 11. When the aforementioned molar ratio is within the above range, deterioration of the hydrogenation active sites can be suppressed without causing a large decrease in the pore volume and the specific surface area.

When the hydrotreating catalyst contains phosphorus, a molar ratio of zinc with respect to phosphorus in the hydrotreating catalyst (zinc element/phosphorus element) is preferably 0.1 to 6, more preferably 1 to 5, and still more preferably 2 to 4. When the aforementioned molar ratio is within the above range, it is possible to suppress the production of zinc phosphate having low hydrogen dissociation activity during catalyst calcination.

A ratio of the average particle size of titanium element-derived particles with respect to the average particle size of phosphorus element-derived particles in the hydrotreating catalyst ((average particle size of titanium element-derived particles)/(average particle size of phosphorus element-derived particles)) is preferably 0.1 to 5, more preferably 0.4 to 3, and still more preferably 0.8 to 1.6. When the aforementioned ratio of the average particle size is within the above range, a decrease in the activity of the phosphorus element-derived particles and the titanium element-derived particles due to sintering is less likely to occur, and a decrease in the transfer efficiency of the active hydrogen species can be suppressed.

A ratio of the average particle size of zinc element-derived particles with respect to the average particle size of phosphorus element-derived particles in the hydrotreating catalyst ((average particle size of zinc element-derived particles)/(average particle size of phosphorus element-derived particles)) is preferably 0.1 to 5, more preferably 0.4 to 3, and still more preferably 0.8 to 1.6. When the aforementioned ratio of the average particle size is within the above range, the production of zinc phosphate due to sintering can be suppressed.

Examples of the form of boron in the hydrotreating catalyst include boron simple substance and boron compounds. Only one of boron simple substance and boron compound may be contained in the hydrotreating catalyst, or both of them may be contained.

Examples of the boron compound in the hydrotreating catalyst include boron oxide, ammonium borate, sodium borate, lithium borate, aluminum borate, zinc borate and nickel borate, and boron oxide and nickel borate are preferred. Examples of the boron compound in the hydrotreating catalyst include, in addition to the above compounds, a complex oxide of boron with at least one selected from the group consisting of zinc, titanium, phosphorus, Group 6 metal, and Group 9 metal and Group 10 metal contained in the hydrotreating catalyst.

The boron compound in the hydrotreating catalyst may include only one type of compound or two or more types of compounds.

The content ratio of boron in the hydrotreating catalyst is preferably 0.1 to 5% by mass, more preferably 0.2 to 4% by mass, and still more preferably 0.4 to 2% by mass in terms of an element based on the catalyst. When the content ratio of boron is equal to or more than the lower limit value of the above range, the interaction between the hydrogenation active component and alumina is weakened, and the activity of the hydrogenation active component is increased. Further, a decrease in the activity of the hydrotreating catalyst is suppressed. When the content ratio of boron is equal to or less than the upper limit value of the above range, the pore volume and the specific surface area are unlikely to decrease, and the hydrogenation active component and the like are sufficiently dispersed.

When the hydrotreating catalyst contains boron, a molar ratio of titanium with respect to boron in the hydrotreating catalyst (titanium element/boron element) is preferably 0.01 to 10, more preferably 0.1 to 5, and still more preferably 0.2 to 1. When the aforementioned molar ratio is within the above range, titanium is less likely to aggregate.

When the hydrotreating catalyst contains boron, a molar ratio of zinc with respect to boron in the hydrotreating catalyst (zinc element/boron element) is preferably 0.01 to 5, more preferably 0.1 to 2, still more preferably 0.1 to 1, and most preferably 0.2 to 1. When the aforementioned molar ratio is within the above range, boron is sufficiently dispersed.

When the hydrotreating catalyst contains boron and phosphorus, a molar ratio of phosphorus with respect to boron in the hydrotreating catalyst (phosphorus element/boron element) is preferably 0.01 to 10, more preferably 0.01 to 1, and still more preferably 0.1 to 0.5.

The specific surface area of the hydrotreating catalyst is preferably 150 to 300 m$^2$/g, and more preferably 190 to 250 m$^2$/g, as measured by the BET method. When the specific surface area is equal to or more than the lower limit value of the above range, the hydrogenation active component is sufficiently dispersed, so that the hydrogenation activity is increased. When the specific surface area is equal to or less than the upper limit value of the above range, the hydrotreating catalyst has a sufficiently large pore diameter. Therefore, the sulfur compound is sufficiently diffused into the catalyst pores, and the hydrogenation activity is increased. That is, when the specific surface area is within the above range, both the dispersibility of the hydrogenation active component and the diffusivity of the sulfur compound into the catalyst pores during the hydrotreatment can be improved.

The average pore diameter in the pore distribution measured by a mercury intrusion method of the hydrotreating catalyst is preferably 5 to 20 nm, and more preferably 7 to 11 nm. When the average pore diameter is within the above range, it is possible to increase the diffusivity of the sulfur compound into the catalyst pores and to further improve the hydrogenation activity while securing a sufficient surface area in the pores (that is, the effective surface area of the catalyst).

The pore volume of the hydrotreating catalyst is preferably 0.45 to 0.8 mL/g, and more preferably 0.45 to 0.7 mL/g, as measured by the mercury intrusion method. When the pore volume is equal to or more than the lower limit value of the above range, the sulfur compound is sufficiently diffused in the catalyst pores during the hydrotreatment, and the hydrogenation activity improves. When the pore volume is equal to or less than the upper limit value of the above range, it is possible to prevent the specific surface area of the catalyst from becoming extremely small. When the pore volume is within the above range, both the dispersibility of the hydrogenation active component and the diffusivity of the sulfur compound into the catalyst pores during the hydrotreatment can be improved.

In order to increase the effective number of pores satisfying the average pore diameter and pore volume described above, for the pore diameter distribution of the hydrotreating catalyst of the present embodiment, a volume ratio of the pores having a pore diameter within a range of average pore diameter ±1.5 nm with respect to the total pore volume is preferably 65% or more, and more preferably 70% or more.

Furthermore, the state of distribution of zinc, titanium, phosphorus, boron, and hydrogenation active components in the hydrotreating catalyst of the present embodiment is preferably of a uniform type in which these components are uniformly distributed in the catalyst.

The content ratio of components other than alumina (including composite alumina materials), zinc titanium, phosphorus, boron, Group 6 metal, and Group 9 and Group 10 metals in the hydrotreating catalyst is preferably as small as possible, and the content ratio of these components with respect to the total mass of the hydrotreating catalyst is preferably 2% by mass or less, and more preferably 1% by mass or less. Examples of the above components include SO$_4^{2-}$, Cl$^-$, Fe$_2$O$_3$, Na$_2$O and the like derived from alumina.

In one aspect of the present invention, it is preferable that the hydrotreating catalyst contains substantially no carbon. The expression "contain substantially no carbon" means that the content ratio of carbon with respect to the total mass of the hydrotreating catalyst is 0.3% by mass or less.

Method for Producing Hydrotreating Catalyst

A method for producing a hydrotreating catalyst for a hydrocarbon oil according to the present embodiment includes: causing a zinc/titanium-containing alumina carrier containing 1 to 14% by mass of zinc in terms of an element based on the carrier and 0.1 to 13% by mass of titanium in terms of an element based on the carrier to support, so as to contain, 5 to 16% by mass of at least one metal selected from Group 6 metals in the periodic table in terms of an element based on the catalyst, and 1 to 5% by mass of at least one metal selected from Group 9 and Group 10 metals in the periodic table in terms of an element based on the catalyst. The average particle size of the titanium element-derived particles observed when the above hydrotreating catalyst is analyzed by TEM-EDS is preferably 0.3 to 10 nm.

The carrier used in the method for producing a hydrotreating catalyst for a hydrocarbon oil according to the present embodiment is preferably a zinc/titanium/(phosphorus and/or boron)-containing alumina carrier further containing 0.04 to 3% by mass of phosphorus in terms of an element based on the carrier, and/or further containing 0.1 to 3% by mass of boron in terms of an element based on the carrier.

Method for Producing Zinc/Titanium/(Phosphorus and/or Boron)-Containing Alumina Carrier A method for producing a zinc/titanium/(phosphorus and/or boron)-containing alumina carrier according to the present embodiment includes: for example, an alumina gel preparation step for preparing an alumina gel; a kneading step for kneading the aforementioned alumina gel to obtain a kneaded product; a molding step for molding the aforementioned kneaded product to obtain a molded product; and a calcination step for drying and calcining the aforementioned molded product to obtain a calcination product.

A step of adding a zinc raw material and a titanium raw material to the alumina gel, kneaded product, molded product or calcination body is included during or after each step, so that the carrier contains 1 to 14% by mass of zinc in terms of an element based on the carrier and 0.1 to 13% by mass of titanium in terms of an element based on the carrier.

Further, it is preferable to include a step of adding a phosphorus raw material to the alumina gel, kneaded product, molded product or calcination body during or after each step, so that the carrier contains 0.04 to 3% by mass of phosphorus in terms of an element based on the carrier.

Furthermore, it is preferable to include a step of adding a boron raw material to the alumina gel, kneaded product, molded product or calcination body during or after each step, so that the carrier contains 0.1 to 8% by mass of boron in terms of an element based on the carrier.

Any material containing aluminum can be used as the alumina raw material, but aluminum salts such as aluminum sulfate and aluminum nitrate are preferred. These alumina raw materials are usually provided as an aqueous solution, and the concentration thereof is not particularly limited, but is preferably 2 to 50% by mass, and more preferably 5 to 40% by mass, with respect to the total mass of the aqueous solution.

For the preparation of alumina gel, for example, a slurry is prepared by mixing an aqueous sulfuric acid solution, sodium aluminate, and aluminum hydroxide in a stirring kettle. The obtained slurry is subjected to water removal using a rotary cylindrical continuous vacuum filter and washing with pure water to obtain an alumina gel.

Subsequently, the obtained alumina gel is washed until $SO_4^{2-}$ and $Na^+$ cannot be detected in the filtrate, and then the alumina gel is mixed with pure water to obtain a uniform slurry. The obtained alumina gel slurry is dehydrated until the water content with respect to the total mass of the slurry reaches 60 to 90% by mass to obtain a cake.

The dehydration of the above alumina gel slurry is preferably carried out by a compression filtration device. The compression filtration device is a device for filtering the slurry by applying compressed air or pump pressure, and is also generally called a filter press. There are a plate and frame type filter press and a recessed plate type filter press. In the plate and frame type filter press, filter plates and, filter frames are fastened alternately between end plates, and the slurry is press-fitted into the filter frame and filtered. The filter plate has a groove that serves as a filtrate flow path, and a filter cloth is attached to the filter frame. On the other hand, in the recessed plate type filter press, filter cloths and recessed plate type filter plates are arranged and fastened alternately between end plates to form a filter chamber (reference literature: Chemical Engineers' Handbook p. 715).

By dehydrating the alumina gel slurry with a filter press, the surface condition of the obtained alumina-containing carrier can be improved, and the degree of sulfurization of the hydrogenation active component can be improved. It should be noted that the dehydration step using a filter press is preferably carried out after at least one of the alumina gel preparation step and the kneading step, and may be carried out after both steps. In particular, it is more preferable to carry out the dehydration step after the alumina, gel preparation step and before the kneading step.

In addition to the above method, as a method for preparing an alumina gel, a method of neutralizing an aqueous solution containing an alumina raw material with a neutralizing agent such as sodium aluminate, aluminic acid or ammonia; a method of mixing with a precipitating agent such as hexanemethylenetetramine or calcium carbonate, and the like can be mentioned.

The amount of the neutralizing agent used is not particularly limited, but is preferably 30 to 70% by mass with respect to the total amount of the aqueous solution containing an alumina raw material and the neutralizing agent. The amount of the precipitating agent used is not particularly limited, but is preferably 30 to 70% by mass with respect to the total amount of the aqueous solution containing an alumina raw material and the precipitating agent.

In the case of forming a composite alumina material by combining alumina with an oxide of the aforementioned zeolite or the like, the process may be carried out after preparing an alumina gel by the above-mentioned method, and subjecting the obtained alumina gel to aging, washing, dehydration and drying, and water content adjustment. As for a combining method, alumina can be combined with an oxide of the aforementioned zeolite or the like by a coprecipitation method, a kneading method or the like. The composite alumina gel undergoes aging, washing, dehydration and drying, and water content adjustment. It is preferable to dehydrate the composite alumina gel using a filter press even in the final dehydration step before molding.

When the zinc raw material, titanium raw material, phosphorus raw material, and boron raw material are solids, it is preferable to perform the kneading step after adding these raw materials to the alumina gel.

When the zinc raw material, titanium raw material, phosphorus raw material, and boron raw material are dissolved in a liquid or a solvent, it is preferable to perform the kneading step after adding these raw materials to the alumina gel, perform the molding step after adding these raw materials to the kneaded product, perform drying and calcining after adding these raw materials to the molded product, or add these raw materials to the calcination body, and it is more preferable to add these raw materials to the calcination body.

As the zinc raw material to be added to the alumina of the hydrotreating catalyst of the present embodiment, zinc simple substance or various zinc compounds can be used, and examples thereof include zinc oxide, zinc nitrate, zinc sulfate, zinc carbonate, zinc chloride, zinc acetate, zinc hydroxide, zinc oxalate, zinc phosphate, zinc aluminate, zinc titanate and zinc molybdate. Among them, zinc oxide, zinc nitrate, zinc sulfate and zinc aluminate are preferred, and zinc nitrate, zinc oxide and zinc aluminate are particularly preferred.

When the zinc raw material is a solid such as zinc oxide, it is preferable to add the zinc raw material to the aluminum gel together with an acid such as nitric acid to perform the kneading step. When the zinc raw material is a solid, the average particle size thereof is preferably 0.01 to 5 $\mu$m, more preferably 0.01 to 2 $\mu$m, and still more preferably 0.01 to 1 $\mu$m.

The average particle size of the zinc raw material is a volume average of the particle size distribution obtained by measurement by a laser diffraction/scattering method in accordance with JIS R1629.

When the zinc raw material is a liquid or a solution dissolved in a solvent (such as an aqueous solution of zinc nitrate), it is preferable to add the liquid or the solution to the calcination body.

The content ratio of zinc in the carrier is preferably 1 to 14% by mass, more preferably 3 to 7% by mass, and still more preferably 3 to 5% by mass in terms of an element based on the carrier.

The average particle size of the zinc element-derived particles in the hydrotreating catalyst and carrier is preferably 0.3 to 10 nm, more preferably 0.3 to 5 nm, and still more preferably 0.3 to 2 nm. The average particle size of the zinc element-derived particles in the carrier can be determined by the same method as that used for the average particle size of the zinc element-derived particles in the hydrotreating catalyst described above.

As the titanium raw material to be added to the alumina of the hydrotreating catalyst of the present embodiment, titanium simple substance or various titanium compounds can be, used, and as the titanium compound, a titanium compound soluble in a solvent is preferred, and a water-soluble titanium compound soluble in water is more preferred.

The water-soluble titanium compound is preferably a compound that is difficult to hydrolyze, and, for example, at least one water-soluble titanium compound selected from the group consisting of: (i) peroxotitanium compound, (ii) peroxotitanium, (ii oxotitanium compound, and (iv) hydroxy (hydroxycarboxylato)titanium compound is preferred. Since the aqueous solutions of these water-soluble titanium compounds are difficult to hydrolyze and are stable, the titanium compounds can be highly dispersed in and uniformly supported on alumina.

(i) Peroxotitanium Compound

A peroxotitanium compound is a water-soluble titanium compound represented by a general formula: $A^1_{x1}[Ti(O_2)_{y1}B^1_{z1}]$. In the above general formula, $A^1$ represents a cation, $B^1$ represents a hydroxycarboxylic acid, and each of x1, y1 and z1 independently represents an integer of 1 to 4. The cation is preferably a cation that does not contain a metal element, and more preferably an ammonium ion. As the hydroxylcarboxylic acid, a hydroxycarboxylic acid known in the art can be used, and citric acid, malic acid, lactic acid, and tartaric acid are preferred. The peroxotitanic acid can be produced by a known production method disclosed in Japanese Unexamined Patent Application, First Publication No. 2002-1115, Japanese Unexamined Patent Application, First Publication No. 2000-159786, or the like.

(ii) Peroxotitanium

Peroxotitanium is a water-soluble titanium compound represented by a general formula $A^2_{x2}[Ti(O_2)_{y2}]$. In the above general formula, $A^2$ represents a cation, and each of x2 and y2 independently represents an integer of 1 to 4. The cation is preferably a cation that does not contain a metal element, and more preferably an ammonium ion. The peroxotitanium can be produced by adding an alkaline compound and hydrogen peroxide to a titanium source and dissolving the titanium source within a pH range of 7 to 14.

It is preferable that the titanium source contains substantially no metals other than titanium and substantially no anions such as chloride ions and sulfate ions. Examples of such a titanium source include titanium hydroxide, titanium hydrous oxide, titanium oxide, and titanium metal. The titanium source is preferably in the form of powder from the viewpoint of ease of dissolution.

Here, the titanium hydroxide is a compound represented by orthotitanic acid ($TiO_2 \cdot nH_2O$, n=about 2), which is in the form of a gel obtained by, a generally known method, that is, alkali neutralization of an aqueous solution of titanium tetrachloride or titanyl sulfate at room temperature, followed by thorough washing, or in the form of a solid obtained by further drying, and has a water content of 2% by mass or more. Further, those in which anions such as chlorine ions, sulfate ions and nitrate ions are not substantially detected are suitably used. The expression "anions are not substantially detected" means that the anion content is 10% by mass or less preferably 5% by mass or less, and more preferably 2% by mass or less based on $TiO_2$.

On the other hand, the titanium hydrous oxide is a compound represented by metatitanic acid ($TiO_2 \cdot nH_2O$, n=about 1), which is in the form of a gel obtained by thermal hydrolysis of a titanium sulfate solution, followed by thorough washing with water, aqueous ammonia or the like in a titanium oxide production step or a substantially equivalent step of the sulfuric acid method, or in the form of a solid obtained by further drying, and has a water content of 2% by mass or more. The water content, is preferably 5% by mass or more, and more preferably 10% by mass or more. Further, those having a sulfate ion content of 5% by mass or less, and preferably 2% by mass or less based on $TiO_2$ are suitably used. If the sulfate ion content in the titanium hydrous oxide is 5% by mass or less, it is preferable because the content of sulfur as an impurity in the finally obtained hydrotreating catalyst is reduced when the obtained peroxotitanium is added to the alumina of the hydrotreating catalyst.

The titanium hydroxide and titanium hydrous oxide may be used in the form of a slurry, but dried forms can also be used. There are no particular restrictions on the drying conditions, and it is preferable to dry at a temperature of 150° C. or lower under general conditions, that is, under normal pressure or reduced pressure. The $TiO_2$ content is determined by calcining at 550° C. for 2 hours to remove water, followed by weighing.

It is generally considered that there is no difference between titanium hydroxide and titanium hydrous oxide as a chemical species, and there is only a difference in the degree of aggregation of the produced fine particles, and each of the above n values is merely a reference value.

The titanium source such as titanium hydroxide, titanium hydrous oxide, and titanium metal are dispersed in a predetermined amount of water to form a slurry. The slurry is then kept within a pH range of 7 to 14, and preferably 8 to 13 in the presence of an alkaline compound and hydrogen peroxide to dissolve the titanium source. The pH value can be adjusted by the amount of the alkaline compound added. When the pH value is equal to or more than the lower limit value of the above range, dissolution of the titanium source proceeds favorably, and when the pH value is equal to or less than the upper limit value of the above range, the decomposition reaction of hydrogen peroxide is suppressed.

The melting temperature of the titanium source is not particularly limited, but is preferably 5 to 80° C., and more preferably 10 to 70° C. When the melting temperature is equal to or higher than the lower limit value of the above range, the dissolution of the titanium source proceeds favorably. When the melting temperature is equal to or less than the upper limit value of the above range, the decomposition reaction of hydrogen peroxide is suppressed.

As the alkaline compound, alkali metals, alkaline earth metals, rare earth metals and the like can also be used, and aqueous alkali metal salt solutions, aqueous alkaline earth metal salt solutions and aqueous rare earth metal salt solutions of peroxotitanium can be prepared. However, since it is preferable that the aqueous peroxotitanium solution does not usually contain a metal other than titanium, ammonia (aqueous ammonia) is usually used as the alkaline compound.

The amount of the alkaline compound added is preferably 1.5 to 20 moles with respect to 1 mole of $TiO_2$. The amount of hydrogen peroxide added is preferably 1 to 20 moles with respect to 1 mole of $TiO_2$. When the amounts of the alkaline compound and hydrogen peroxide added are equal to or more, than the lower limit values of the above ranges the dissolution of the titanium source proceeds favorably. The order of addition of the alkaline compound and the hydrogen peroxide solution is not particularly limited, and they may be added in any manner as long as the pH is set within the above range. However, from the viewpoint of suppressing the decomposition reaction of hydrogen peroxide, it is preferable to gradually add the hydrogen peroxide solution after adding the alkaline compound.

The aqueous peroxotitanium solution produced in this manner can be diluted for use if required.

(iii) Oxotitanium Compound

An oxotitanium compound is a water-soluble titanium compound represented by a general formula: $A^3_{x3}[Ti(O)_{y3}B^3_{z3}]$. In the above general formula, $A^3$ represents a cation, $B^3$ represents a hydroxycarboxylic acid, x3 is 0.4 to 4, and each of y3 and z3 independently represents 0.2 to 2. The cation is preferably a cation that does not contain a metal element, and more preferably an ammonium ion. As the hydroxylcarboxylic acid, a hydroxycarboxylic acid known in the art can be used, and citric acid, malic acid, lactic acid, and tartaric acid are preferred. The oxotitaniuin compound can be produced by a known production method disclosed in Japanese Unexamined Patent Application, First Publication No. 2004-74148 or the like.

(iv) Hydroxy(hydroxycarboxylato)titanium Compound

A hydroxy(hydroxycarboxylato)titanium compound is a water-soluble titanium compound represented by a general formula: $[Ti(OH)_{x4}(B^4)_{y4}]$. In the above general formula, $B^4$ represents a hydroxycarboxylic acid, and each of x4 and y4 independently represents 1 to 4. As the hydroxylcarboxylic acid, a hydroxycarboxylic acid known in the art can be used, and citric acid, malic acid, lactic acid, and tartaric acid are preferred. The hydroxy(hydroxycarboxylato)titanium compound can be produced by a known production method disclosed in Japanese Unexamined Patent Application, First Publication No. 2000-256376 or Japanese Unexamined Patent Application, First Publication No. 2000-351787. Further, examples of commercially available products include a dihydroxybis(lactato)titanium monoammonium salt.

It is preferable to add an aqueous solution of a water-soluble titanium compound in which the water-soluble titanium compound is dissolved in water to the calcination body.

The content ratio of titanium in the carrier is preferably 0.1 to 13% by mass, more preferably 3 to 10% by mass, and still more preferably 5 to 9% by mass in terms of an element based on the carrier.

The average particle size of the titanium element-derived particles in the hydrotreating catalyst and carrier is preferably 0.3 to 10 nm, more preferably 0.3 to 5 nm, and still more preferably 0.3 to 2 nm. The average particle size of the titanium element-derived particles in the carrier can be determined by the same method as that used for the average particle size of the titanium element-derived particles in the hydrotreating catalyst described above.

As the phosphorus raw material to be added to the alumina of the hydrotreating catalyst of the present embodiment, phosphorus simple substance or various compounds can be used, and examples thereof include orthophosphoric acid, metaphosphoric acid, pyrophosphoric acid, triphosphoric acid, tetraphosphoric acid, and aluminum phosphate, and among them, orthophosphoric acid is preferred.

It is preferable to add a phosphorus raw material to the aluminum gel to perform the kneading step.

The content ratio of phosphorus in the carrier is preferably 0.04 to 3% by mass, more preferably 0.2 to 2% by mass, and still more preferably 0.4 to 1% by mass in terms of an element based on the carrier.

The average particle size of the phosphorus element-derived particles in the hydrotreating catalyst and carrier is preferably 0.3 to 10 nm, more preferably 0.3 to 5 nm, and still more preferably 0.3 to 2 nm. The average particle size of the phosphorus element-derived particles in the carrier can be determined by the same method as that used for the average particle size of the phosphorus element-derived particles in the hydrotreating catalyst described above.

As the boron raw material to be added to the alumina of the hydrotreating catalyst of the present embodiment, boron simple substance or various compounds can be used, and examples thereof include boric acid, boron oxide, ammonium borate, sodium borate, lithium borate, aluminum borate, zinc borate and nickel borate, and among them, boric acid is preferred.

It is preferable to add an aqueous solution of a boron raw material in which the boron raw material is dissolved in water to the calcination body.

The content ratio of boron in the carrier is preferably 0.1 to 8% by mass, more preferably 0.3 to 5% by mass, and still more preferably 0.5 to 2% by mass in terms of an element based on the carrier.

In the case of performing the kneading step after adding the above raw materials to the alumina gel, the above raw materials are added to the alumina gel obtained in the alumina gel preparation step to perform kneading. More specifically, the above raw materials heated to 15 to 90° C. are added to a water content-adjusted product of the alumina gel heated to 50 to 90° C. Then, the resulting mixture is kneaded and stirred using a heating kneader or the like to obtain a kneaded product. As described above, dehydration by a filter press may be carried out after kneading and stirring the alumina gel and the above raw materials. As described above, the above raw materials may be added as solids, as liquids, or as liquids in which the above raw materials are dissolved or suspended in solvents.

Then, the obtained kneaded product is molded, dried, and calcined to obtain a calcination body. The kneaded product can be molded by various molding methods such as extrusion molding and pressure molding. Further, the drying temperature of the obtained molded product is preferably 15 to 150° C., and more preferably 80 to 120° C. The drying time is preferably 30 minutes or more. The calcination temperature for the above calcination can be appropriately set as needed, but for example, the calcination temperature for producing γ-alumina is preferably 450° C. or higher, and more preferably 480 to 600° C. The calcination time is preferably 2 hours or more, and more preferably 3 to 12 hours.

When the above raw materials are added to the calcination body, a known method such as an impregnation method, a coprecipitation method, a deposition method, and an ion exchange method may be used. Examples of the impregnation method include: an evaporation drying method in which a calcination body is immersed in an impregnation solution that is excessive with respect to the total pore volume of the calcination body, and then the solvent is completely dried, thereby supporting the above raw materials; an equilibrium adsorption method in which a calcination body is immersed in an impregnation solution that is excessive with respect to the total pore volume of the calcination body, and then an impregnated body on which the above raw materials are supported is obtained by a solid-liquid separation process such as filtration; and a pore filling method in which a calcination body is impregnated with an impregnation solution in an amount almost equal to the total pore volume of the calcination body, and the solvent is completely dried, thereby supporting the above raw materials. It should be noted that as a method of impregnating the calcination body with the above raw materials, a batch, impregnation method of simultaneously impregnating each of these raw materials, or a sequential impregnation method of individually impregnating each of these raw materials may be employed.

When the above raw materials are supported by the impregnation method or the like described above, generally, the water content is removed to some degree (so that LOI (loss on ignition) is 50% or lower) at a temperature of from room temperature to 80° C. in a nitrogen stream, an air stream, or a vacuum. Then, drying is conducted in a drying furnace in an air stream at 80 to 150° C. for 10 minutes to 10 hours. Subsequently, calcination is carried out in a calcination furnace in an air stream at 300 to 700° C., more preferably 500 to 650° C., for 10 minutes to 10 hours, more preferably 3 hours to 6 hours.

The specific surface area of the carrier of the present embodiment is a value measured by a nitrogen adsorption method (BET method), and is preferably 200 to 400 m²/g, and more preferably 250 to 360 m²/g. When the specific surface area is equal to or more than the lower limit value of the above range, the hydrogenation active component is sufficiently dispersed, so that the hydrogenation activity is increased. When the specific surface area is equal to or less than the upper limit value of the above range, the carrier has a sufficiently large pore diameter, so that the pore diameter of the hydrotreating catalyst is also sufficiently large. Therefore, the sulfur compound is sufficiently diffused into the catalyst pores, and the hydrogenation activity is increased. That is, when the specific surface area is within the above range, a hydrotreating catalyst exhibiting favorable dispersibility of the hydrogenation active component and having a sufficiently large pore diameter can be obtained.

The average pore diameter in the pore distribution measured by a mercury intrusion method of the carrier of the present embodiment is preferably 4 to 12 nm, and more preferably 6 to 8 nm. When the average pore diameter is within the above range, the surface area in the pores is sufficient, the sulfur compound is sufficiently diffused into the catalyst pores, and the hydrogenation activity is increased.

The pore volume of the carrier of the present embodiment is preferably 0.5 to 0.9 mL/g, and more preferably 0.55 to 0.8 mL/g, as measured by the mercury intrusion method. When the pore volume is equal to or more than the lower limit value of the above range, the amount of solvent that enters inside the pores becomes sufficient when the catalyst is prepared by a usual impregnation method. When the amount of the solvent is sufficient, the hydrogenation active component is satisfactorily dissolved in the solvent, and the dispersibility of the hydrogenation active component improves, resulting in a highly active catalyst. Although there is a method of adding a large amount of an acid such as nitric acid in order to increase the solubility of the hydrogenation active component, if it is added too much, the surface area of the carrier would be reduced, which will be the main cause of the decrease in the hydrogenation activity. When the pore volume is equal to or less than the upper limit value of the above range, the specific surface area becomes sufficiently large, and the dispersibility of the hydrogenation active component improves. That is, when the pore volume is within the above range, a sufficient specific surface area is secured and a sufficient amount of solvent can enter inside the pore volume, so that both the solubility and dispersibility of the hydrogenation active component become favorable, and the hydrogenation activity is further improved.

Support of Hydrogenation Active Component

The zinc/titanium/(phosphorus and/or boron)-containing alumina carrier obtained in this manner is caused to support, so as to contain, 5 to 16% by mass of at least one metal selected from Group 6 metals in the periodic table in terms of an element based on the catalyst, and 1 to 5% by mass of Group 9 and Group 10 metals in the periodic table in terms of an element based on the catalyst.

In the hydrotreating catalyst of the present embodiment, the Group 6 metal raw material to be supported on the carrier is preferably a molybdenum compound, and examples thereof include molybdenum trioxide, molybdophosphoric acid, ammonium molybdate and molybdic acid, and molybdophosphoric acid, molybdenum trioxide and ammonium molybdate are preferred.

In the hydrotreating catalyst of the present embodiment, examples of the Group 9 and Group 10 metal raw materials to be supported on the carrier include nickel oxide, nickel carbonate, nickel acetate, nickel nitrate, nickel sulfate and nickel chloride, and nickel nitrate and nickel carbonate are preferred.

As the method for causing the carrier to support the Group 6 metal raw material and the Group 9 and Group 10 metal raw materials (hereinafter, also referred to as "hydrogenation active component raw materials"), a known method such as an impregnation method, a coprecipitation method, a kneading method, a deposition method, and an ion exchange method may be used. Examples of the impregnation method include: an evaporation drying method in which the carrier is immersed in an impregnation solution that is excessive with respect to the total pore volume of the carrier, and then the solvent is completely dried, thereby supporting the hydrogenation active component raw materials; an equilibrium adsorption method in which the carrier is immersed in an impregnation solution that is excessive with respect to the total pore volume of the carrier, and then a catalyst on which the hydrogenation active component raw materials are supported is obtained by a solid-liquid separation process such as filtration; and a pore filling method in which the carrier is impregnated with an impregnation solution in an amount almost equal to the total pore Volume of the carrier, and the solvent is completely dried, thereby supporting the hydrogenation active component raw materials. It should be noted that as a method of impregnating the carrier with the hydrogenation active component raw materials, a batch impregnation method of simultaneously impregnating each of these components, or a sequential impregnation method of individually impregnating each of these components may be employed.

Specific examples of the method for causing the carrier to support the hydrogenation active component raw material include the following method.

First, an impregnation solution containing a hydrogenation active component raw material is prepared. At the time of preparation, in order to promote the dissolution of these hydrogenation active component raw materials, heating (30 to 100° C.) or the addition of an acid (nitric acid, phosphoric acid or organic acid (such as citric acid, acetic acid, malic acid and tartaric acid)) may be performed. That is, in the present embodiment, in addition to the phosphorus contained in the carrier, phosphorus may be separately supported, when the carrier is caused to support the hydrogenation active component raw material or the like.

Examples of phosphorus compounds to be added separately when the hydrogenation active component raw materials or the like are supported on the carrier include a hydrogenation active component raw material containing phosphorus such as molybdophosphoric acid, and orthophosphoric acid, metaphosphoric acid, pyrophosphoric acid, triphosphoric acid and tetraphosphoric acid, and orthophosphoric acid is preferred. When the hydrogenation active component raw materials are supported on the carrier, if phosphorus is separately supported, the dispersibility of the hydrogenation active component in the obtained hydrotreating catalyst can be improved.

Subsequently, the prepared impregnation solution is gradually added to the carrier so as to be uniform and impregnated. The impregnation time is preferably 1 minute to 5 hours, and more preferably 5 minutes to 3 hours. The impregnation temperature is preferably 5 to 100° C., and more preferably 10 to 80° C. The impregnation atmosphere is not particularly limited, but impregnation operations in air, nitrogen, and vacuum are suitable.

A ratio of the mass of phosphorus kneaded in the carrier in terms of an oxide with respect to the mass of the Group 6 metal raw material in terms of an oxide is preferably 0.01 to 1.5. If the ratio is within the above range, not only the surface area and pore volume of the catalyst do not decrease and the decrease in catalytic activity is suppressed, but also carbon deposition can be prevented without increasing the amount of acid, thereby suppressing the deterioration in activity.

When a molybdenum compound is used as the Group 6 metal raw material, a ratio of the mass of phosphorus kneaded in the carrier in terms of an oxide with respect to the mass of the molybdenum compound in terms of an oxide is preferably 0.01 to 1.5, and more preferably 0.05 to 1.0. When the ratio of the mass of phosphorus kneaded in the carrier in terms of an oxide with respect to the mass of the molybdenum compound in terms of an oxide is within the above range, the Group 9 and Group 10 metal compounds or the like and molybdenum in the hydrotreating catalyst can be integrated in complete harmony.

In the method for producing a hydrotreating catalyst of the present embodiment, after supporting a hydrogenation active component raw material or the like, the water content of the impregnated body is first removed to some degree (so that LOI (loss on ignition) is 50% or lower) at 15 to 80° C. in a nitrogen stream, an air stream, or a vacuum. Then, drying is conducted in a drying furnace in an air stream at 80 to 150° C. for 10 minutes to 10 hours. Subsequently, calcination is carried out in a calcination furnace in an air stream. The calcination temperature is preferably 300 to 700° C., and more preferably 500 to 650° C. The calcination time is preferably 10 minutes to 10 hours, and more preferably 3 hours or more.

Method for Producing Hydrogenated Hydrocarbon Oil (Method for Hydrotreating Hydrocarbon Oil)

A method for producing a hydrogenated hydrocarbon oil of the present embodiment is a method for producing a hydrogenated hydrocarbon oil in which the hydrotreating catalyst for a hydrocarbon oil according to the present invention described above and a hydrocarbon oil are subjected to a contact treatment to carry out a hydrotreatment at a hydrogen partial pressure of 3 to 20 MPa, a reaction temperature of 280 to 450° C., and a liquid hourly space velocity of 0.01 to 5 hr$^{-1}$.

A method for hydrotreating a hydrocarbon oil of the present embodiment is a method for hydrotreating a hydrocarbon oil in which the hydrotreating catalyst for a hydrocarbon oil according to the present invention described above and a hydrocarbon oil are subjected to a contact treatment at a hydrogen partial pressure of 3 to 20 MPa, a reaction temperature of 280 to 450° C., and a liquid hourly space velocity of 0.01 to 5 hr$^{-1}$.

The hydrogen partial pressure is preferably 3 to 20 MPa, more preferably 5 to 17.5 MPa, and still more preferably 7 to 15 MPa. When the hydrogen partial pressure is equal to or higher than the lower limit value of the above range, the hydrogenation reaction tends to proceed.

The reaction temperature is preferably 280 to 450° C., more preferably 290 to 430° C., and still more preferably 300 to 420° C. When the reaction temperature is equal to or higher than the lower limit value of the above range, the catalytic activity can be sufficiently exhibited. When the reaction temperature is equal to or less than the upper limit value of the above range, the thermal decomposition of the hydrocarbon oil proceeds moderately, while the catalyst degradation is unlikely to occur. The reaction temperature refers to an average temperature of the catalyst layer.

The liquid hourly space velocity is preferably 0.01 to 5 hr$^{-1}$, more preferably 0.05 to 4 hr$^{-1}$, and still more preferably 0.1 to 3 hr$^{-1}$. When the liquid hourly space velocity is equal to or higher than the lower limit value of the above range, the productivity improves. When the liquid hourly space velocity is equal to or less than the upper limit value of the above range, the removal capacity of sulfur content improves.

A hydrogen/hydrocarbon oil ratio is preferably 400 to 3,000 $Nm^3/kL$, more preferably 450 to 2,500 $Nm^3/kL$, and still more preferably 500 to 2.000 $Nm^3/kL$.

Examples of the hydrocarbon oil provided in the method for producing a hydrogenated hydrocarbon oil (method for hydrotreating a hydrocarbon oil) of the present embodiment include an atmospheric distillation residual oil obtained by atmospheric distillation of crude oil with an atmospheric distillation apparatus, a vacuum distillation residual oil obtained by further distillation under reduced pressure of the atmospheric distillation residual oil with a vacuum distillation apparatus, a vacuum distillation gas oil, heavy extracts which are particularly heavy oil contents among the oil contents extracted and removed by solvent extraction of lubricant base oils such as a hydrocracked heavy oil, a fluid catalytic cracking residual oil and a deasphalted oil.

The density of the hydrocarbon oil provided in the method for producing a hydrogenated hydrocarbon oil (method for hydrotreating a hydrocarbon oil) of the present embodiment is preferably 0.8 to 1.15 $g/cm^3$, more preferably 0.82 to 1.1 $g/cm^3$, and still more preferably 0.84 to 1.06 $g/cm^3$. The sulfur content is preferably 2 to 7% by mass, more preferably 1.5 to 6.5% by mass, and still more preferably 0.8 to 6% by mass. The nickel content is preferably 200 mass ppm or less, the vanadium content is preferably 400 mass ppm or less, and the asphaltene content is preferably 15% by mass or less.

The density of the hydrogenated hydrocarbon oil produced by the method for producing a hydrogenated hydrocarbon oil (method for hydrotreating a hydrocarbon oil) of the present embodiment is preferably 0.7 to 1.05 $g/cm^3$, more preferably 0.75 to 1.0 $g/cm^3$, and still more preferably 0.77 to 0.95 $g/cm^3$. The sulfur content is preferably 0.01 to 0.8% by mass, more preferably 0.05 to 0.6% by mass, and still more preferably 0.1 to 0.5% by mass. The nickel content is preferably 50 mass ppm or less, the vanadium content is preferably 100 mass ppm or less, and the asphaltene content is preferably 5% by mass or less.

The hydrotreating catalyst of the present embodiment may be activated by a sulfidation, treatment in a reactor before use (that is, prior to performing the hydrotreating method of the present embodiment). This sulfidation treatment can be generally carried out, in a hydrogen atmosphere at 200 to 400° C., preferably 250 to 350° C., at a hydrogen partial pressure of normal pressure or higher, by causing petroleum distillates containing sulfur compounds, products obtained by adding a sulfating agent such as dimethyl disulfide and carbon disulfide to the petroleum distillates, or hydrogen sulfide to pass through a hydrotreating catalyst.

By hydrotreating a hydrocarbon oil using the hydrotreating catalyst of the present embodiment, the hydrotreatment is allowed to proceed satisfactorily, and the sulfur compounds in the hydrocarbon oil can be reduced for a long period of time.

In order to carry out the hydrotreating method of the present embodiment on a commercial scale, the hydrotreatment may be carried out under the above conditions by forming a fixed bed-, moving bed-, or fluidized bed-type catalyst layer of the hydrotreating catalyst of the present embodiment in a reactor, and introducing raw oil into the reactor. In the most common case, a fixed bed catalyst layer is formed in a reactor, raw oil is introduced into an upper part of the reactor and passed through the fixed bed from top to bottom, and the resulting product is discharged from a lower part of the reactor; or conversely, raw oil is introduced into a lower part of the reactor and passed through the fixed bed from bottom to top, and the resulting product is discharged from an upper part of the reactor.

The hydrotreating method of the present embodiment may be a single stage hydrotreating method carried out by filling the hydrotreating catalyst of the present embodiment in a single reactor, or may be a multistage continuous hydrotreating method carried out by filling in several reactors.

The hydrotreating method of the present embodiment may be a hydrotreating method in which three types of catalysts (a front stage catalyst, a middle stage catalyst, and a rear stage catalyst) are brought into contact. Such a hydrotreating method using three types of catalysts is preferably used for heavy hydrocarbon oils such as atmospheric distillation residual oil and vacuum distillation residual oil, and each catalyst is mainly required to have different performance characteristics. In the front stage catalyst, metal resistance performance and demetallization activity for protecting catalysts in the middle and subsequent stages are mainly required. The middle stage catalyst is required to have metal resistance performance, demetallization activity, and desulfurization performance in a balanced manner. The rear stage catalyst is mainly required to have desulfurization performance. In such a reaction system, it is preferable to use the above-mentioned hydrotreating catalyst of the present invention as a middle stage catalyst. As the front stage catalyst, a front stage catalyst known in the art can be used, and examples of such front stage catalysts include front stage catalysts described in Japanese Unexamined Patent Application, First Publication No. 2010-248476, International Patent Publication No. 2015/053087, and International Patent Publication No. 2015/046323. As the rear stage catalyst, a rear stage catalyst known in the art can be used, and examples of such rear stage catalysts include rear stage catalysts described in Japanese Unexamined Patent Application, First Publication No. 2010-248476, International Patent Publication No. 2015/053087, and International Patent Publication No. 2015/046323.

In the hydrotreating method of the present embodiment, the filling ratio of the front stage catalyst is preferably 10 to 50%, and more preferably 15 to 40% with respect to the total catalyst volume. The filling ratio of the middle stage catalyst is preferably 10 to 50%, and more preferably 15 to 40% with respect to the total catalyst volume. The filling ratio of the rear stage catalyst is preferably 20 to 70%, and more preferably 30 to 65% with respect to the total catalyst volume. The sum of the filling ratio of the front stage catalyst, the filling ratio of the middle stage catalyst, and the filling ratio of the rear stage catalyst may be 100%. When the filling ratios of the front stage catalyst, the middle stage catalyst, and the rear stage catalyst are within the above ranges, it is suitable for maintaining the catalyst life, desulfurization activity, and demetallization activity.

EXAMPLES

Hereinafter, the present invention will be described in more detail with reference to Examples and Comparative Examples, but the present invention is not limited to the following Examples.

Physical Properties and Chemical Properties of Catalyst

[1] Analysis of Physical Properties (Specific Surface Area, Pore Volume, Average Pore Diameter, Pore Distribution, and Average Particle Diameter)

(a) Measurement Method and Equipment Used

The specific surface area was measured, by the BET method by nitrogen adsorption. As a nitrogen adsorption apparatus, a surface area measuring device (BELSORP-mini II) manufactured by MicrotracBEL Corporation was used.

The pore volume, the average pore diameter, and the pore distribution were measured by a mercury intrusion method. As a mercury intrusion apparatus, a porosimeter (AutoPore IV, manufactured by Micromeritics Instrument Corporation) was used.

In a planar image of each particle observed with a transmission electron microscope (TEM-EDS, JEM-ARM200F NEOARM: manufactured by JEOL Ltd.) using energy dispersive X-ray analysis, the particle sizes of the zinc element-derived particles, titanium element-derived particles, and phosphorus element-derived particles in the hydrotreatment catalyst were measured as the maximum distance between two parallel straight lines sandwiching the above image. The particle size of 10 randomly selected particles was measured for each type of particles, and the average thereof was taken as the average particle size. The measurement conditions were as follows.

Accelerating voltage: 200.00 kV
Measuring magnification: 500,000 to 3 million times
EDS energy range: 0 to 40 keV (b) Measurement Principle of Mercury Intrusion Method The mercury intrusion method is based on the law of capillarity. In the case of mercury and cylindrical pores, this law is expressed by the following equation. That is, the volume of mercury entering the pores as a function of the applied pressure P is measured. It should be noted that the surface tension of the mercury in the pores of the catalyst was 484 dyne/cm, and the contact angle was set to 130°.

$$D = -(1/P)4\gamma \cos\theta$$

In the equation, D represents a pore diameter, P represents an applied pressure, $\gamma$ represents a surface tension, and $\theta$ represents a contact angle.

The pore volume is the total volume of mercury that has entered the pores per 1 g of catalyst. The average pore diameter is an average value of D calculated as a function of P.

The pore distribution is a distribution of D calculated as a function of P.

(c) Measurement Procedure (1) The power of a vacuum heating deaerator is turned on and it is confirmed that the temperature is set to 400° C. and the degree, of vacuum is set to $5 \times 10^{-2}$ Torr or less.

(2) An empty sample burette is attached to the vacuum heating deaerator.

(3) After confirming that the degree of vacuum reached $5 \times 10^{-2}$ Torr or less, the sample burette is detached from the vacuum heating deaerator by closing its cock, cooled, and then weighed.

(4) A sample (catalyst) is placed in the sample burette.

(5) The sample burette containing the sample is attached to the vacuum heating deaerator and held for 1 hour or more after the degree of vacuum reached $5 \times 10^{-2}$ Torr or less.

(6) The sample burette containing the sample is detached from the vacuum heating deaerator, cooled, and then weighed to obtain the weight of the sample.

(7) The sample is placed in a cell for AutoPore IV.

(8) Measurement is carried out by AutoPore IV.

[2] Analysis of Chemical Composition

It was confirmed by the following method that the content ratio of each element in the hydrotreatment catalyst and in the carrier was a ratio based on the amount of the raw material added.

(a) Analytical Method and Equipment Used

Elemental analysis in the carrier and catalyst was performed using an inductively coupled plasma optical emission spectrometer (iCAP 6000: manufactured by Thermo Scientific).

Quantification of elements was performed by an absolute calibration curve method.

(b) Measurement Procedure (1) 0.05 g of a catalyst or carrier, 1 mL of hydrochloric acid (50% by mass), one drop of hydrofluoric acid, and 1 mL of pure water were charged into a uniseal, and dissolved by heating.

(2) After dissolution, the resulting mixture was transferred to a measuring flask made of polypropylene (50 mL), pure water was added thereto, and the resulting mixture was weighed to 50 mL.

(3) This solution was measured by the above inductively coupled plasma optical emission spectrometer.

Hydrotreatment of Hydrocarbon Oil

A hydrotreatment of a mixed oil of atmospheric distillation residual oil and vacuum distillation residual oil having the following properties was carried out in the following manner. First, a demetallization catalyst (hydrodemetallization catalyst in which nickel and molybdenum were supported on a zinc-containing alumina carrier) as a front stage catalyst and a hydrotreatment catalyst of each Example or Comparative Example as a rear stage catalyst were filled so as to have a volume ratio of 15:85 in a high-pressure flow reactor to form a fixed bed catalyst layer, and a pretreatment was performed under the following conditions. Next, a fluid mixture of a raw oil and a hydrogen-containing gas was introduced from the upper part of the reactor to allow a hydrotreatment reaction to proceed under the following conditions. A fluid mixture of the produced oil and gas was allowed to flow out from the lower part of the reactor, and the produced oil was separated by a gas-liquid separator.

Catalyst pretreatment conditions: dried at 120° C. for 3 hours under normal pressure.

Presulfurization of the catalyst was carried out with a vacuum gas oil at a hydrogen partial pressure of 10.3 MPa and 370° C. for 12 hours. After that, it was changed to a raw oil for activity evaluation.

Reaction Conditions

Pressure (hydrogen partial pressure): 10.3 MPa
Liquid, hourly space velocity: 0.253 hr$^{-1}$
Hydrogen/oil ratio: 876.2 Nm$^3$/kL
Reaction temperature: 380° C.

Properties of Raw Oil

Oil type: Mixed oil of atmospheric distillation residual oil and vacuum distillation residual oil (derived from Middle Eastern crude oil)
Density (15° C.); 0.9906 g/cm$^3$
Sulfur content: 3.56% by mass
Vanadium: 19.8 mass ppm
Nickel: 36.2 mass ppm
Asphaltene content: 4.21% by mass
The catalytic activity was analyzed by the following method. The reactor was operated under the above conditions, the produced oil was collected every other day from the start of the operation, and the desulfurization reaction rate constant was calculated by the following formula.

$$\text{Desulfurization reaction rate constant } (Ks)=[1Sp-1/Sf]\times(\text{LHSV})$$

In the above formula, Sf represents the sulfur content in the raw oil, Sp represents the sulfur content in the produced oil, and LHSV represents the liquid hourly space velocity. The above reaction rate constant (Ks) is a constant of the reaction rate equation for obtaining a secondary reaction order with respect to the amount of decrease in the sulfur content (Sp) of the produced oil. The higher the reaction rate constant, the higher the catalytic activity.

Production Example 1

1.5 L of a 12% by mass sulfuric acid aqueous solution was charged into 100 L of pure water filled in a stirring kettle, and the resulting mixture was heated to 95° C., and then vigorously stirred with a stirring impeller for 5 minutes. 3.9 L of sodium aluminate having an alumina concentration of 70 g/L was charged thereto to prepare aluminum hydroxide, and then the resulting mixture was stirred with a stirring impeller for 24 hours. The obtained slurry was charged into a filtration device and filtered to remove water. Then, the obtained gel was washed with pure water until SO$_4^{2-}$ and Na$^+$ could not be detected in the filtrate. Subsequently, the washed gel was mixed with pure water until it became turbid to form a uniform slurry, and the slurry was charged into a filter press. The above slurry was sandwiched between filter plates via a filter cloth and dehydrated by pressing the filter plates. Filtration was interrupted when the water content in the cake reached 80% by mass due to the dehydration. This cake was charged into a heating kneader (set temperature: 80° C.) and kneaded sufficiently so as to be uniform, followed by addition of phosphoric acid and zinc oxide particles so as to achieve a composition of carrier A shown in Table 1, and the resulting mixture was further kneaded to be uniform. The average particle size of the zinc oxide particles was 0.8 µm. It should be noted that a volume average of the particle size distribution obtained by measurement by a laser diffraction/scattering method in accordance with JIS R1629 was taken as the average particle size of the zinc oxide particles. The cake obtained by kneading was charged into an extrusion molding machine to obtain a four-leaf shaped, extrusion molded product having a major axis of 1.3 mm and a minor axis of 1.1 mm. This molded product was dried and then calcined at 600° C. for 4 hours to obtain a phosphorus/zinc-containing alumina carrier precursor.

5.7 g of a metallic titanium powder, 80 mL of a 30% hydrogen peroxide solution, and 20 mL of 30% aqueous ammonia were mixed in a beaker and dissolved while cooling in a water bath to obtain a transparent yellow titanium peroxy solution. Next, 27.4 g of citric acid was added to the obtained solution and completely dissolved. This solution was heated at 50 to 80° C. for 3 hours and unreacted hydrogen peroxide and ammonia were removed to obtain 50 mL of an aqueous solution of a water-soluble titanium compound (titanium peroxycitrate compound).

In a recovery flask, the phosphorus/zinc-containing alumina carrier precursor was impregnated with the above aqueous solution of the water-soluble titanium compound so as to achieve the composition of the carrier A shown in Table 1 to obtain an impregnated body. The impregnated body was dried and then calcined at 500° C. for 4 hours in an air atmosphere to obtain a zinc/titanium/phosphorus-containing alumina carrier A.

Table 1 shows the content ratio of each component in the carrier A in terms of element based on the carrier and (hereinafter, the same applies to carriers B to 1).

Production Example 2

The zinc/titanium/phosphorus-containing alumina carrier B was obtained in the same procedure as in Production Example 1 except that the amounts of phosphoric acid, zinc oxide particles, and water-soluble titanium compound added were adjusted so as to achieve the composition of the carrier B shown in Table 1.

Production Example 3

The zinc/titanium/phosphorus-containing alumina carrier C was obtained in the same procedure as in Production Example 1 except that the amounts of phosphoric acid, zinc oxide particles, and water-soluble titanium compound added were adjusted so as to achieve the composition of the carrier C shown in Table 1.

Production Example 4

The zinc/titanium/phosphorus-containing alumina carrier D was obtained in the same procedure as in Production Example 1 except that the amounts of phosphoric acid, zinc oxide particles, and water-soluble titanium compound added were adjusted so as to achieve the composition of the carrier D shown in Table 1.

Production Example 5

The zinc/titanium/phosphorus/boron-containing alumina carrier E was obtained in the same procedure as in Production Example 1 except that the amounts of phosphoric acid, zinc oxide particles, and water-soluble titanium compound added were adjusted so as to achieve the composition of the carrier E shown in Table 1, and boric acid was added so as to achieve the composition of the carrier E. It should be noted that boric acid was added in a predetermined, amount to the aqueous solution of the water-soluble titanium compound, and was added at the same time as the water-soluble titanium compound.

Production Example 6

The zinc/phosphorus-containing alumina carrier F was obtained in the same procedure as in Production Example 1 except that the amounts of phosphoric acid, and zinc oxide, particles added were adjusted so as to achieve the composition of the carrier F shown in Table 1, and no operation was performed after the addition of the water-soluble titanium compound.

Production Example 7

The titanium/phosphorus-containing alumina carrier G was obtained in the same procedure as in Production Example 1 except that the amounts of phosphoric acid and water-soluble titanium compound added were adjusted so as to achieve the composition of the carrier G shown in Table 1, and zinc oxide particles were not added.

Production Example 8

The titanium/phosphorus-containing alumina carrier H was obtained in the same procedure as in Production Example 1 except that a titanium ethanol solution obtained by dissolving tetrabutoxytitanium in ethanol was used in place of the water-soluble titanium compound, the amounts of phosphoric acid and titanium ethanol solution added were adjusted so as to achieve the composition of the carrier H shown in Table 1, and zinc oxide particles were not added.

Production Example 9

The titanium/phosphorus-containing alumina carrier I was obtained in the same procedure as in Production Example 1 except that a 30% titanium sulfate aqueous solution was used in place of the water-soluble titanium compound, the amounts of phosphoric acid and 30% titanium sulfate aqueous solution added were adjusted so as to achieve the composition of the carrier I shown in Table 1, and zinc oxide particles were not added.

the catalyst, the average particle size, and the specific surface area, pore volume, average pore diameter, and a ratio of the volume of pores having pore diameters in a range of ±1.5 nm from the average pore diameter with respect to the total pore volume, of the catalyst A. It should be noted that the term "pore distribution" in Table 2 means "ratio of the volume of pores having pore diameters in a range of ±1.5 nm from the average pore diameter with respect to the total pore volume" (hereinafter, the same applies to the descriptions of catalysts B to I).

Using the catalyst A, a hydrotreatment reaction of a mixed oil of atmospheric distillation residual oil and vacuum distillation residual oil was carried out under the above conditions. The results are shown in Table 3 (hereinafter, the results of the catalysts B to I are also shown in the same manner). It should be noted that the specific activity in Table 3 is a specific activity when a desulfurization reaction rate constant obtained in a case where the hydrotreatment reaction of the above mixed oil was carried out using a catalyst F (Comparative Example 1) vas taken as 100%.

Example 2

The catalyst B was obtained in the same procedure as in Example 1 except that the zinc/titanium/phosphorus-containing alumina carrier B obtained in Production Example 2 was used instead of the zinc/titanium/phosphorus-containing alumina carrier A, and a hydrotreatment reaction of a mixed oil of atmospheric distillation residual oil and vacuum distillation residual oil vas carried out.

Example 3

The catalyst C was obtained in the same procedure as in Example 1 except that the zinc/titanium/phosphorus-containing alumina carrier C obtained in Production Example 3 was used instead of the zinc/titanium/phosphorus-containing alumina carrier A, and a hydrotreatment reaction of a mixed oil of atmospheric distillation residual oil and vacuum distillation residual oil was carried out.

Example 4

The catalyst D was obtained in the same procedure as in Example 1 except that the zinc/titanium/phosphorus-con-

TABLE 1

|  |  | Carrier A | Carrier B | Carrier C | Carrier D | Carrier E | Carrier F | Carrier G | Carrier H | Carrier I |
|---|---|---|---|---|---|---|---|---|---|---|
| Zinc | % by mass | 3.7 | 3.6 | 3.5 | 3.3 | 3.6 | 3.8 | 0 | 0 | 0 |
| Titanium | % by mass | 1.4 | 2.9 | 5.7 | 8.6 | 1.4 | 0 | 2.9 | 1.4 | 1.4 |
| Phosphorus | % by mass | 0.6 | 0.6 | 0.6 | 0.5 | 0.6 | 0.6 | 0.6 | 1.5 | 1.5 |
| Boron | % by mass | 0 | 0 | 0 | 0 | 0.7 | 0 | 0 | 0 | 0 |

Example 1

An aqueous molybdenum/nickel solution was prepared by dissolving 10.77 g of ammonium molybdate tetrahydrate, 14.10 g of citric acid monohydrate, and 11.39 g of nickel nitrate in 37.2 g of ion-exchanged water. The zinc/titanium/phosphorus-containing alumina carrier A obtained in Production Example 1 was impregnated with the above aqueous solution so as to achieve the composition of the catalyst A described in Table 2 in a recovery flask, thereby obtaining an impregnated body. The impregnated body was dried and then calcined at 500° C. for 4 hours in an air atmosphere to obtain a catalyst A. Table 2 shows the content ratio of each component in the catalyst A in terms of elements, based on taining alumina carrier D obtained in Production Example 4 was used instead of the zinc/titanium/phosphorus-containing alumina carrier A, and a hydrotreatment reaction of a mixed oil of atmospheric distillation residual oil and vacuum distillation residual oil was carried out.

Example 5

The catalyst E was obtained in the same procedure as in Example 1 except that the zinc/titanium/phosphorus/boron-containing alumina carrier E obtained in Production Example 5 was used instead of the zinc/titanium/phosphorus-containing alumina carrier A, and a hydrotreatment reaction of a mixed oil of atmospheric distillation residual oil and vacuum distillation residual oil was carried out.

Comparative Example 1

The catalyst F was obtained in the same procedure as in Example 1 except that the zinc/phosphorus-containing alumina carrier F obtained in Production Example 6 was used instead of the zinc/titanium/phosphorus-containing alumina carrier A, and a hydrotreatment reaction of a mixed oil of atmospheric distillation residual oil and vacuum distillation residual oil was carried out.

Comparative Example 2

The catalyst G was obtained in the same procedure as in Example 1 except that the titanium/phosphorus-containing alumina carrier G obtained in Production Example 7 was used instead of the zinc/titanium/phosphorus-containing alumina carrier A, and a hydrotreatment reaction of a mixed oil of atmospheric distillation residual oil and vacuum distillation residual oil was carried out.

Comparative Example 3

The catalyst H was obtained in the same procedure as in Example 1 except that the titanium/phosphorus-containing alumina carrier H obtained in Production Example 8 was used instead of the zinc/titanium/phosphorus-containing alumina carrier A, and a hydrotreatment reaction of a mixed oil of atmospheric distillation residual oil and vacuum distillation residual oil was carried out.

Comparative Example 4

The catalyst I was obtained in the same procedure as in Example 1 except that the titanium/phosphorus-containing alumina carrier I obtained in Production Example 9 was used instead of the zinc/titanium/phosphorus-containing alumina carrier A, and a hydrotreatment reaction of a mixed oil of atmospheric distillation residual oil and vacuum distillation residual oil was carried out.

TABLE 3-continued

|  | | Specific activity (catalyst F = 100) | |
|  | Catalyst | After 2 days | After 7 days |
| --- | --- | --- | --- |
| Ex. 3 | Catalyst C | 100 | 129 |
| Ex. 4 | Catalyst D | 88 | 131 |
| Ex. 5 | Catalyst E | 95 | 116 |
| Comp. Ex. 1 | Catalyst F | 100 | 100 |
| Comp. Ex. 2 | Catalyst G | 117 | 103 |
| Comp. Ex. 3 | Catalyst H | 82 | 85 |
| Comp. Ex. 4 | Catalyst I | 98 | 81 |

It was found that the catalysts of Examples 1 to 5 of the present invention had higher specific activities after 7 days and hydrogenation activities were less likely to decrease than the catalyst of Comparative Example 1 containing no titanium and the catalysts of Comparative Examples 2 to 4 containing no zinc. In particular, the effect of suppressing the decrease in hydrogenation activity was remarkable in Examples 3 and 4 in which the content ratio of titanium was 4.0% by mass or more in terms of element based on the catalyst.

INDUSTRIAL APPLICABILITY

The hydrotreatment catalyst for hydrocarbon oil according to the present invention is useful because it can be used to reduce the sulfur content in the hydrocarbon oil.

The invention claimed is:

1. A hydrotreating catalyst for a hydrocarbon oil, wherein the hydrotreating catalyst comprises at least one metal selected from Group 6 metals in the periodic table and at least one metal selected from Group 9 and Group 10 metals in the periodic table supported on a zinc/titanium-containing alumina carrier, wherein a content of said zinc is 0.8 to 10% by mass based on a total mass of the catalyst, a content of said titanium is 0.03 to 10% by mass based on the total mass of the catalyst, a content of said at least one metal selected from Group 6 metals in the periodic table is 5 to 16% by mass based on the total mass of the catalyst, a

TABLE 2

|  |  | Catalyst A | Catalyst B | Catalyst C | Catalyst D | Catalyst E | Catalyst F | Catalyst G | Catalyst H | Catalyst I |
| --- | --- | --- | --- | --- | --- | --- | --- | --- | --- | --- |
| Zinc | % by mass | 3.1 | 3.1 | 2.9 | 2.8 | 3.0 | 3.2 | 0 | 0 | 0 |
| Titanium | % by mass | 1.2 | 2.4 | 4.8 | 7.2 | 1.2 | 0 | 2.4 | 1.2 | 1.2 |
| Phosphorus | % by mass | 0.5 | 0.5 | 0.5 | 0.4 | 0.5 | 0.5 | 0.5 | 1.3 | 1.3 |
| Boron | % by mass | 0 | 0 | 0 | 0 | 0.6 | 0 | 0 | 0 | 0 |
| Molybdenum | % by mass | 8.0 | 8.0 | 8.0 | 8.0 | 8.0 | 8.0 | 8.0 | 8.0 | 8.0 |
| Nickel | % by mass | 3.1 | 3.1 | 3.1 | 3.1 | 3.1 | 3.1 | 3.1 | 3.1 | 3.1 |
| Zinc average particle size | nm | 1.31 | 1.35 | 1.32 | 1.36 | 1.33 | 1.31 | — | — | — |
| Titanium average particle size | nm | 1.13 | 1.16 | 1.22 | 1.28 | 1.16 | — | 1.18 | 1.21 | 1.20 |
| Phosphorus average particle size | nm | 1.04 | 1.10 | 1.06 | 1.06 | 1.13 | 1.06 | 1.14 | 1.20 | 1.21 |
| Specific surface area | m²/g | 247 | 241 | 234 | 228 | 242 | 257 | 258 | 251 | 267 |
| Pore volume | mL/g | 0.56 | 0.53 | 0.51 | 0.49 | 0.54 | 0.57 | 0.55 | 0.51 | 0.44 |
| Average pore diameter | nm | 9.0 | 9.1 | 9.2 | 9.3 | 9.0 | 8.7 | 8.9 | 9.0 | 9.0 |
| Pore distribution | % | 73 | 74 | 75 | 76 | 70 | 75 | 76 | 79 | 76 |

TABLE 3

|  | | Specific activity (catalyst F = 100) | |
|  | Catalyst | After 2 days | After 7 days |
| --- | --- | --- | --- |
| Ex. 1 | Catalyst A | 75 | 106 |
| Ex. 2 | Catalyst B | 94 | 114 | content of said at least one metal selected from Group 9 and Group 10 metals in the periodic table is 1 to 5% by mass based on the total mass of the catalyst, and wherein a molar ratio of titanium with respect to zinc in the hydrotreating catalyst is 2 to 12.

2. The hydrotreating catalyst for a hydrocarbon oil according to claim 1, wherein an average particle size of titanium element-derived particles observed when said hydrotreating catalyst is analyzed by a transmission electron microscope using energy dispersive X-ray analysis is 0.3 to 10 nm.

3. The hydrotreating catalyst for a hydrocarbon oil according to claim 1, wherein said carrier is a zinc/titanium/phosphorus-containing alumina carrier further containing phosphorus, and a content of said phosphorus is 0.04 to 2% by mass based on the total mass of the catalyst.

4. The hydrotreating catalyst for a hydrocarbon oil according to claim 1, wherein an average particle size of zinc element-derived particles observed when said hydrotreating catalyst is analyzed by a transmission electron microscope using energy dispersive X-ray analysis is 0.3 to 10 nm.

5. A method for producing the hydrotreating catalyst for a hydrocarbon oil according to claim 1, the method comprising:

causing a zinc/titanium-containing alumina carrier containing 1 to 14% by mass of zinc based on a total mass of the carrier and 0.1 to 13% by mass of titanium based on the total mass of the carrier to support, so as to contain, 5 to 16% by mass of at least one metal selected from Group 6 metals in the periodic table based on the catalyst, and 1 to 5% by mass of at least one metal selected from Group 9 and Group 10 metals in the periodic table based on the total mass of the catalyst.

6. The method for producing a hydrotreating catalyst for a hydrocarbon oil according to claim 5, wherein an average particle size of titanium element-derived particles observed when said hydrotreating catalyst is analyzed by a transmission electron microscope using energy dispersive X-ray analysis is 0.3 to 10 nm.

7. The method for producing a hydrotreating catalyst for a hydrocarbon oil according to claim 5, wherein said carrier is a zinc/titanium/phosphorus-containing alumina carrier further containing 0.04 to 3% by mass of phosphorus based on the total mass of the carrier.

8. The method for producing a hydrotreating catalyst according to claim 5, wherein an average particle size of zinc element-derived particles observed when said hydrotreating catalyst is analyzed by a transmission electron microscope using energy dispersive X-ray analysis is 0.3 to 10 nm.

9. A method for hydrotreating a hydrocarbon oil, wherein the hydrotreating catalyst for a hydrocarbon oil according to claim 1 and a hydrocarbon oil are subjected to a contact treatment at a hydrogen partial pressure of 3 to 20 MPa, a reaction temperature of 280 to 450° C., and a liquid hourly space velocity of 0.01 to 5 hr$^{-1}$.

* * * * *